Figure 1:
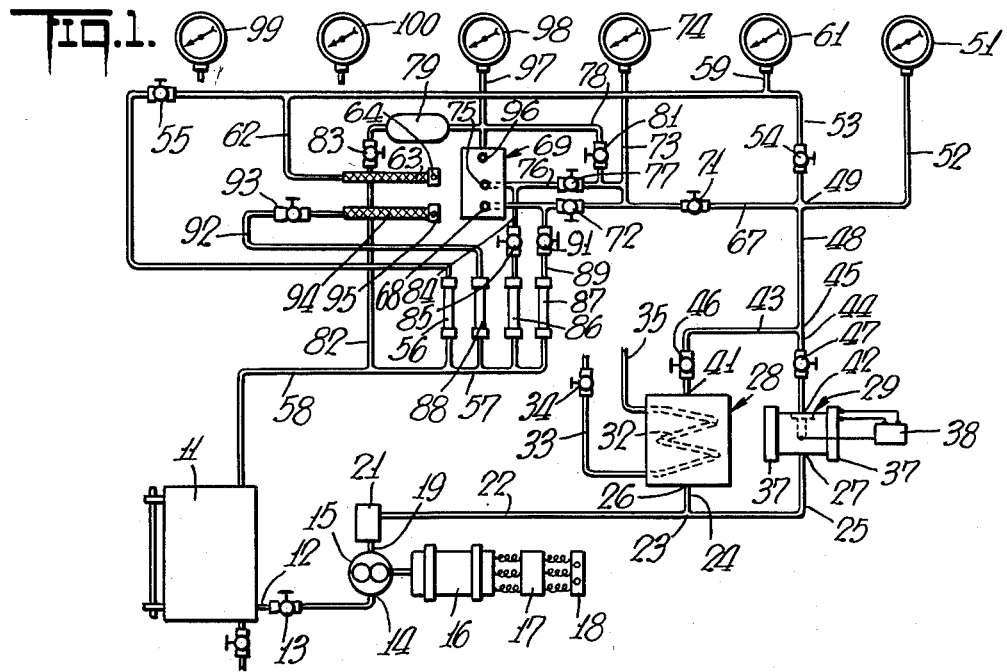

Jan. 3, 1956   E. M. GREER   2,729,095
TEST EQUIPMENT FOR OIL TEMPERATURE REGULATING VALVES
Filed March 20, 1952

INVENTOR
Edward M. Greer
BY
Dean Fairbank & Hirsch
ATTORNEYS

2,729,095
Patented Jan. 3, 1956

United States Patent Office 2,729,095

TEST EQUIPMENT FOR OIL TEMPERATURE REGULATING VALVES

Edward M. Greer, Great Neck, N. Y., assignor to Greer Hydraulics, Inc., a corporation of New York Application March 20, 1952, Serial No. 277,589

4 Claims. (Cl. 73—1)

This invention relates to test equipment, more particularly of the type to test oil temperature regulating valve assemblies.

As conducive to an understanding of the invention it is noted that as the lubricating oil in an aircraft engine is circulated in a closed circuit through the engine, to the oil reservoir and back to the engine, its temperature increases, partly because of direct heat pickup from the hot surfaces and partly because of heat generated by mechanical friction. The oil serves to cool the engine and to lubricate moving surfaces, and in order for it to fulfill these functions efficiently, its temperature must be controlled within certain limits.

If the oil temperature is too high, the chemical stability of the oil is endangered and sludge and gum may be formed that close oil ports and cause piston ring sticking. The hot oil removes less heat from the piston and sticking may result. If the oil temperature is too low, insufficient oil may reach the wearing surfaces with resultant serious breakdown.

To overcome the dangers due to improper oil temperature, an oil temperature regulating assembly is included in the oil circuit. Such assembly may consist of a cooling unit and an automatic temperature regulating valve unit, which regulates the oil temperature by controlling either the flow of oil passed through the cooling unit or the flow of cooling air. Thus, if the oil is cold and very viscous, such as when the aircraft is started on a cold day and flow through the cooling unit is restricted, the regulating valve unit automatically provides an alternate or by-pass passageway through the cooling unit and as the oil heats up, it is sent through the cooling unit and the air flaps or shutters of the cooling unit are automatically regulated, depending upon the temperature of the oil to retain the latter within a given temperature range.

In addition, where the oil pressure in the system rises to an abnormally high value, such as when surges of abnormally high pressures occur due to "gunning" of the engine, the regulating valve unit is designed to by-pass the cooling unit so that no injury will result thereto.

In order that the various valves and thermostat incorporated in the oil temperature regulating valve unit may be properly checked prior to installation in the aircraft, it is desirable that each of the conditions above mentioned, i. e., low and high temperatures and high pressures such as that due to pressure surges, be simulated by means of a test equipment on which the temperature regulating valve unit is mounted and in order that such regulating units may be rapidly checked, it is essential that each of such conditions can be quickly simulated.

It is accordingly among the objects of the invention to provide a test equipment for an oil temperature regulating valve unit, which is relatively simple in construction and is not likely to become deranged even after long use and which, with but a few simple manipulations which may readily be performed by even an unskilled mechanic, may rapidly be adjusted to simulate the various conditions of operation of an engine so as to pass through such oil temperature regulating valve unit, oil under pressure which may quickly be set to either a low or high temperature or to any intermediate temperature and to provide high pressures or surges in the oil line so that the operation of such unit may be checked.

According to the invention, these objects are accomplished by the arrangement and combination of elements hereinafter described and particularly recited in the claims.

This application is a continuation-in-part of copending application Serial No. 750,484 filed May 26, 1947, now abandoned.

Figure 2:
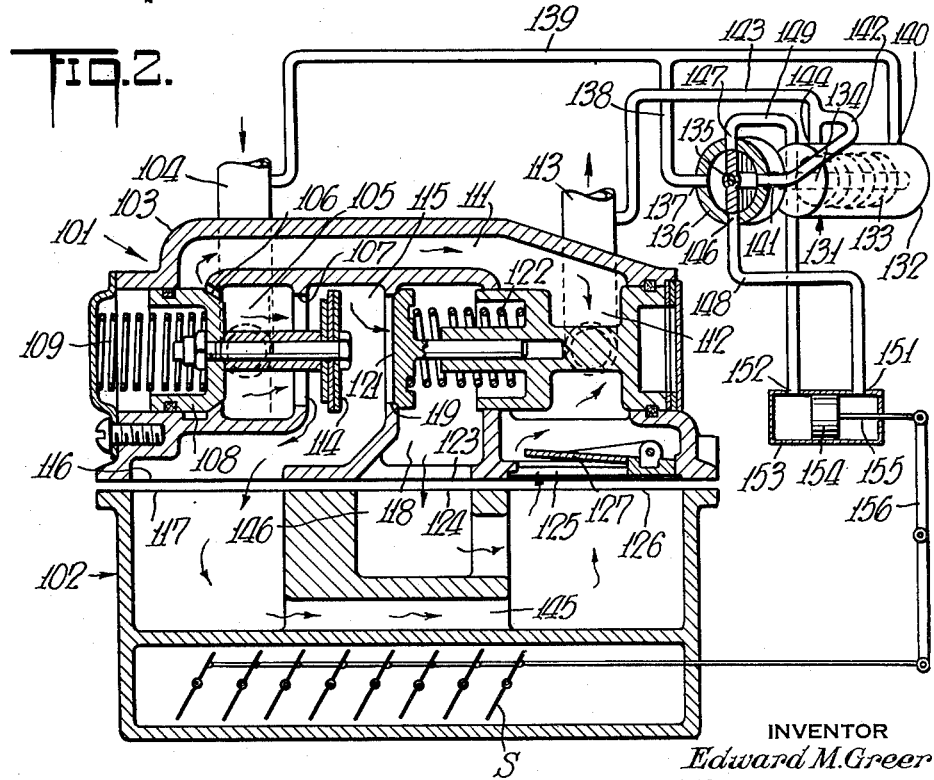

In the accompanying drawings in which is shown one of various possible embodiments of the several features of the invention, Fig. 1 is a circuit diagram of the test equipment, and Fig. 2 is a diagrammatic view of a typical oil temperature regulating valve assembly to be tested by the equipment, mounted on a cooling unit.

Referring now to the drawings, the test equipment desirably comprises a reservoir 11 connected by line 12 through a shut-off valve 13 to the inlet 14 of an oil pump 15 which desirably is of the type having a pressure relief valve, and is especially designed for extreme temperature conditions. As such pump is of conventional design, it will not be further described. The pump, which is driven by a suitable motor 16 connected through a starter 17 to a source of power and controlled by push button switch 18, has its outlet 19 connected through strainer 21 and line 22 to a junction 23. The junction 23 in turn is connected by branch lines 24 and 25 to the inputs 26 and 27 of a fluid cooling unit 28 and a fluid heating unit 29, respectively. The cooling unit 28 may comprise a chamber having suitable cooling coils 32 therein, through which a cooling liquid may circulate. The inlet line 33 of the cooling coils, has a control valve 34 therein and is connected to a source of cooling liquid (not shown). The outlet line 35 affords a return for the liquid passing through the cooling coils to a suitable drain (not shown). Of course, if desired, the coils 32 could be part of a conventional refrigerating unit.

The heating unit 29 also comprises a chamber having suitable electrical heating elements 37 therein controlled by a thermostat 38 so that the liquid in the heating chamber may be maintained at any desired temperature.

The outlets 41 and 42 of the cooling and heating units are connected by suitable lines 43 and 44 to a junction 45, each line having a control valve 46 and 47 therein, respectively.

The junction 45 is connected by line 48 to a junction 49 to which a temperature gauge 51 is connected by line 52. Also connected to junction 49 is a feed line 53 which desirably has a pair of spaced control valves 54 and 55 therein between junction 49 and the inlet of sight glass 56 to which line 53 is connected, the outlet of said sight glass 56 being connected to junction 57 which in turn is connected by line 58 to reservoir 11.

Connected to line 53 between valves 54 and 55 is a line 59 which is connected to a pressure gauge 61. Also connected to line 53 between valves 54 and 55 by a line 62 is a length of flexible hose 63 which has a coupling 64 at the end thereof for attachment to the oil input port of the valve unit under test. Junction 49 is connected by line 67 to port 68 in valve unit mounting pad 69, said line 67 having a pair of spaced valves 71 and 72 therein.

Connected to line 67 between valves 71 and 72 is a line 73 which leads to a pressure gauge 74. Connected at one end to line 73 and at its other end to port 75 of the mounting pad 69 is a by-pass line 76 which has a valve 77 therein. A surge line 78 is connected at one end to line 76 between line 73 and valve 77 and at its other end to one end of a surge chamber 79, a valve 81 being interposed in said line 78. The other end of said chamber 79 is connected by bleeder line 82 through valve 83 to line 58.

A line 84 is connected at one end to line 76 between port 75 and valve 77 and has a valve 85 therein. The other end of line 84 is connected to one end of sight glass 86, the other end of which is connected to junction 57. Also connected to junction 57 are sight glasses 87 and 88. Sight glass 87 is connected by line 89 through valve 91 to line 67 between port 68 and valve 72. Sight glass 88 is connected by line 92 through valve 93 to flexible hose 94 which has a coupling 95 at the end thereof for attachment to the oil outlet port of the valve unit under test.

The port 96 of the mounting pad is connected by line 97 to line 78 and to pressure gauge 98, and two additional pressure gauges 99 and 100 are also provided, the function of which will hereinafter be described.

A typical oil temperature regulating valve unit 101, which is illustrative of the type of unit that can be tested by the equipment, and cooling unit 102 are diagrammatically shown in Fig. 2. As such valve unit may, for example, be similar to the type shown in the patent to Jensen No. 2,437,961, dated March 16, 1948, and as the cooling unit may be of the type put out by Air Research Mfg. Company of Los Angeles, the units will be described only to the extent necessary for a clear understanding of the invention.

The regulating valve unit 101 desirably comprises a casing 103 having an inlet port 104 which is connected to the oil pump of the engine. The inlet port 104 leads into a chamber 105 which has openings 106 and 107 at the respective ends thereof. A valve member 108 is normally urged against opening 106 as by a coil spring 109 so that the passageway 111 from said chamber 105 to outlet chamber 112 is normally closed to prevent flow of oil from chamber 105 through outlet port 113 connected to chamber 112. The valve member 108 controls a valve head 114 normally spaced from opening 107 when valve member 108 is in closed position so that communication is afforded from chamber 105 to chamber 115 which is in turn connected by port 116 to port 117 of cooling unit 102. Chamber 115 is in communication with a chamber 118 through an opening 119 normally closed by relief valve head 121 retained against opening 119 by coil spring 122. The chamber 118 has a port 123 which is connected to port 124 of the cooling unit 102. The outlet chamber 112 desirably has a port 125 connected to port 126 of the cooling unit 102, which is controlled by a flap valve 127 which closes the port 125 to prevent oil flow from outlet chamber 112 into port 126 of the cooling unit, but permits oil to flow from the cooling unit into the outlet chamber 112.

The regulating valve unit also includes a thermostatic control unit 131 which controls the position of the shutters S of the cooling unit. The thermostatic unit may comprise a casing 132 in which is positioned bi-metallic helical coils 133 which control a shaft 134 connected to a valve disk 135 to rotate the latter in valve casing 136. The casing 136 desirably has an inlet port 137 connected to the inlet port 104 from the engine oil pump by lines 138 and 139, line 139 also being connected to the inlet port 140 of the casing 132. The casing 136 also has an outlet port 141 connected by lines 142 and 143 to outlet port 113, the casing 132 also having a port 144 connected by line 143 to said outlet port 113. The valve casing 136 also has two diametrically spaced ports 146 and 147 illustratively spaced 90 degrees from the inlet and outlet ports 137 and 141 respectively and connected by lines 148 and 149 to ports 151 and 152 in a cylinder 153 on each side of a piston 154 therein. The piston has a piston rod 155 which, through a linkage 156 controls the shutters S of the oil cooling unit 102. The valve disk 135 is so designed that in one position it will close ports 146 and 147; in a second position it will connect ports 137 and 146 to cause the piston 154 to move in one direction and in a third position it will connect ports 137 and 147 to cause the piston to move in the opposite direction.

With the temperature regulating valve assembly connected as above described, when oil from the engine flows through inlet port 104 into chamber 105, as such oil is initially cold and very viscous, as is the oil in the cooling unit 102, which may be congealed, a high back pressure will be developed in chambers 105 and 115 due to the inability of the oil to flow through passageway 145 in the cooling unit. As a result, the valve head 121 will be moved to the right to provide communication between chambers 115 and 118.

The oil will consequently flow from chamber 118 through ports 123 and 124, by-pass passageway 146 in the cooling unit, ports 126 and 125, past flap valve 127 into chamber 112 and thence through outlet port 113.

As the oil is warmed due to the operation of the engine, the flow of such warm oil through passageway 146, will gradually heat up the oil in passageway 145 in the cooling unit so that its viscosity will decrease and oil will start to flow from chamber 115 through ports 116, 117, passageway 145, through ports 126 and 125, flap valve 127 into chamber 112.

As a result of such initial flow of oil through passageway 145 due to the heating of the oil and the lowering of its viscosity, the back pressure in chamber 115 will gradually drop to an amount insufficient to overcome the tension of coil spring 122 and valve head 121 will start to close opening 119.

As this occurs, inasmuch as the force of the back pressure in chambers 105 and 115 against the surface of valve member 108 in chamber 105 and valve head 114 in chamber 115, which tend to move valve member 108 to the left, will be greater than the force exerted against the surface of valve head 114 exposed to the force of the oil flowing from chamber 105 into chamber 115, which tends to move valve member 108 to the right, the tension of coil spring 109 will be overcome and valve member 108 will start to open the opening 106.

Consequently, a portion of the oil flowing into chamber 105 will flow through opening 106, passageway 111, chamber 112 and out of outlet port 113.

As opening 107 will remain partially open, and as a portion of the heated oil is also flowing through passageway 145, the oil in such passageway will de-congeal and the back pressure in chambers 105 and 115 will fall until spring 109 moves valve member 108 to the right to seal opening 106. At such time all of the oil flowing into chamber 105 will flow through passageway 145 in the cooling unit.

In the event of a sudden high pressure or surge into the inlet port 104 due to, for example, "gunning" of the engine, a corresponding high pressure will be developed in chambers 105 and 115. As a result, the valve head 121 will move to the right to open opening 119 to by-pass the oil through passageway 146 in the cooling unit to chamber 112 and thence through outlet port 113. Simultaneously such high pressure will also cause valve member 108 to move to the left to open opening 106 for flow of oil through passageway 111 to chamber 112. As a result of such surge protection, the oil will be by-passed around the passageway 145 in the cooling unit to prevent injury thereto.

As the oil flows through inlet port 104, a portion thereof will pass through line 139 into port 140 of the casing 132 of thermostatic control unit 131 and thence from port 144 through line 143 into outlet port 113. As the oil is initially cold, the thermostat 133 will rotate the valve disk 135 to provide communication, say between inlet port 137 and port 147 so that oil may flow through line 149 into the cylinder 153 to move the piston 154 thereof in direction to close the shutters S to decrease the cooling action of the air which normally flows therethrough.

As the temperature of the oil flowing through the thermostatic unit 131 increases, the valve disk 135 will be rotated. If the temperature is at a normal operating value, the valve disk 135 will close both ports 146 and 147 so that no oil will flow to the cylinder 153 and the shutters of the cooling unit will remain in the previously set position. If the oil temperature should increase above the desired operating value, the valve disk 135 will be rotated so that the inlet port 137 will be connected to port 146 thereby causing the piston 154 in cylinder 153 to move in the opposite direction to open the shutters S for enhanced cooling action.

Having thus described briefly the operation of a typical temperature regulator valve assembly, the operation of the test equipment now to be described, will be more readily understood.

*Operation*

When a valve unit is to be tested, it is placed on the mounting pad 69 which simulates the cooling unit 102 so that ports 68, 75 and 96 of the pad are aligned with ports 116, 123 and 125 of the valve unit respectively. The couplings 64 and 95 are connected respectively to inlet port 104 and outlet port 113 of the valve unit and the gauges 99 and 100 are connected respectively to potrs 146 and 147 of the thermostatically controlled valve 136 to take the place of the cylinder 153.

With all the valves open in the test equipment shown in Fig. 1, but valves 47, 55, 71, 72, 77, 81 and 91, and with heating elements 37 energized, the motor 16 is energized to drive the pump 15. As a result, oil will flow from reservoir 11, through line 12, open valve 13, pump 15, line 19, strainer 21, line 22, junction 23, line 24, through cooling unit 28 which is being cooled by the flow of a coolant through coils 32, open valve 46, line 43, junction 45, lines 48, 53, open valve 54, line 62 and hose 63 into inlet port 104 of valve unit 101, the gauge 61 connected by line 59 to line 53 indicating the pressure of the oil in such line and the gauge 51 connected by line 52 to line 53 indicating the temperature of the oil.

The flow of coolant through coils 32 is adjusted by valve 34 and the pressure of the oil is adjusted by valve 55 until the temperature and pressure simulates the condition of the oil when a cold engine is started.

By reason of the closing of valves 71, 72 and 91 which simulate the congealed oil in passageway 145 of the cooling unit 102 which prevents flow of oil therethrough and by reason of the back pressure built up in chambers 105 and 115 by the cold oil flowing into line 104 at the temperature and pressure of the oil set on gauges 51 and 61, the tension of coil spring 122 should be overcome and valve head 121 should move to the right from the position shown in Fig. 2 to open opening 119.

As a result, the oil will flow from chamber 115 into chamber 118 and through port 123 into port 75 of the mounting pad, and thence through line 84, open valve 85, sight glass 86, junction 57, line 58 to reservoir 11.

This test indicates whether or not the valve 121 is correctly set and operating properly so that the flow of cold oil would normally be diverted from passageway 145 in the cooling unit through by-pass passageway 146 to outlet line 113, and the flow of oil through the sight glass 86 indicates exactly when valve 121 has opened.

In normal operation, as previously described, the engine will start to warm the oil flowing through the system and through the by-pass passageway 146 which in turn heats the congealed oil in passageway 145 so that a slight flow will start therethrough. This condition is simulated by regulating valves 46 and 47 to increase the oil temperature, thereby to reduce its viscosity and by slightly opening valve 91 for flow of oil through line 89 and sight glass 87.

As the temperature of the oil is gradually increased, the back pressure in chamber 115 will start to decrease and valve 121 will start to close. As a result, the pressure in chambers 115 and 105 of the valve will move valve member 108 to the left for flow of oil from chamber 105, through opening 106, passageway 111, chamber 112, outlet port 113, hose 94, open valve 93, line 92, sight glass 88, junction 57, line 58 to reservoir 11.

The flow of oil through sight glass 88 will indicate the closing of valve head 121 and the opening of valve member 108 and the temperature and pressure at which this occurs can be seen on gauges 51 and 61 respectively.

The tests above described will indicate whether the valve unit 101 is functioning properly to control the flow of oil upon engine starting.

To test the valve unit 101 for surge protection afforded to the cooling unit in the event of sudden high pressures in the oil system due to "gunning" of the engine, the surge chamber 79 is first bled by opening valve 83 which is then closed. In addition, valves 55, 71, 72, 77 are closed and all other valves are opened.

The oil will pass through valve 54, line 62, hose 63, inlet port 104, chambers 105, 115, port 116, port 68, line 67, valve 91 which is opened only slightly, sight glass 87, junction 57, line 58 to reservoir 11. Valves 72 and 71 are then quickly opened in sequence. As a result of the flow of oil through line 67, open valves 71 and 81 into surge chamber 79, the air therein will be compressed and a shock wave will result which will cause a sudden high pressure, indicated on gauge 98, to be imposed on the oil flowing through line 67 and open valve 72 into port 68. Consequently, a high pressure will be built up in chamber 115 of the valve which will cause valve head 121 to move to the right to provide communication between chambers 115 and 118. Oil will therefore flow from chamber 118, through port 123, port 75, line 84, open valve 85, sight glass 86, junction 57 and line 58 to reservoir 11. When oil is seen in the sight glass 86, which indicates that valve 121 has opened, the pressure on gauge 74 is noted.

To test the thermostatic valve 136, the regulating valves 46 and 47 are adjusted until a predetermined temperature below normal operating temperature is indicated on gauge 51. The oil will flow through line 139 and port 140 into casing 132, circulate about the bi-metallic unit 133 and thence flow out of port 144 and line 143 back to the reservoir. At such predetermined temperature the thermostatic unit will rotate valve disk 135 to provide communication between port 137 connected to oil inlet port 104 and port 147 connected to pressure gauge 100. As port 146 of valve 136 is connected to pressure gauge 99, the pressure indication on gauge 100 should be greater than that on gauge 99 which indicates that the thermostatic unit 133 is operating properly so that if the cylinder 153 was connected to ports 146 and 147 the piston 154 therein would be moved to regulate the cooler shutters in one direction to decrease the flow of air for reduced cooling action. By increasing the temperature of the oil above the normal operating temperature, the thermostatic unit should rotate valve disk 135 to provide communication between port 137 connected to oil inlet port 104 and port 146 connected to pressure gauge 99. The pressure indicated on gauge 99 should be greater than that indicated on gauge 100 which indicates that the thermostatic unit is operating properly to regulate the cooler shutter in the opposite direction to regulate the shutter to increase the flow of air for enhanced cooling action.

With the valves 46 and 47 regulated so that the temperature indication on gauge 51 is at the normal operating temperature, the thermostatic unit should rotate valve disk 135 until ports 146 and 147 are both closed. This would be indicated by identical pressures on gauges 99 and 100 respectively.

With the test equipment above described, by merely adjusting the various valves in proper manner, any standard oil temperature regulating valve can be tested for all conditions of operation. By reason of the heating and cooling units in the system between the oil reservoir and the unit under test, the desired temperature can be attained rapidly so that a relatively large number of units can be tested within a given period.

The operation of the test equipment for the valve shown in Fig. 2 has been described merely to illustrate the mode of operation of such equipment. It is of course to be understood that for other types of oil temperature regulating valves to be tested, the flow of oil through the valve under test could be directed according to manufacturing specifications by regulating the various control valves in suitable manner.

As many changes could be made in the above equipment, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. Equipment for testing valve units of the type having an inlet port, an outlet port and a plurality of pressure controlled valve means, said equipment comprising a reservoir, an oil cooling unit, an oil heating unit, means to force oil from said reservoir through said units, a feed line having its outlet end connected to said reservoir, a sight glass in said feed line, valve means controlling the flow of oil from each of said units to the input of said feed line so that the oil therein may be set at a predetermined value, an oil temperature gauge connected to said feed line, a pressure gauge connected to said feed line, a test pad having three ports for mounting of such valve unit to be tested thereon, an oil inlet line connected at one end to said feed line and having a coupling at its other end for connection to the oil inlet port of the valve under test which is associated with one of the ports of the mounting pad, a shut off valve in said feed line between said oil inlet line and said sight glass, valve means to control the flow of oil from the port of said test pad associated with the oil inlet line, a by-pass line having a sight glass therein connected at one end to the second of the ports in said test pad and at its other end leading to said reservoir, valve means to control said by-pass line, whereby upon flow of oil through said feed line into the inlet port of the valve unit under test, the flow of oil through said last named sight glass will indicate opening of pressure controlled valve means in the unit under test at the oil temperature and pressure indicated on said temperature and pressure gauges.

2. The combination set forth in claim 1 in which a line is connected at one end to the port of said test pad associated with the oil inlet line and at its other end to said feed line, said line having a pair of spaced valves therein, a pressure gauge connected to said line between said valves, a second line is connected at one end to said first line between said port and the adjacent valve and the other end of said second line leads to said reservoir, said second line having a valve and a sight glass therein, said three valves forming the valve means controlling said port, a third line having a valve therein is connected at one end to said second port and at its other end to said first line between the valves therein, a surge chamber, a surge line having a valve therein connecting one end of said surge chamber to said third line between the valve therein and the first line, a bleeder line having a valve therein connecting the other end of said surge chamber to said reservoir, a pressure gauge connected to the third port of said test pad and to said surge line and a valve in said feed line between the cut off valve therein and the connection of the first line thereto.

3. The combination set forth in claim 1 in which an oil outlet line having a coupling at one end for connection to the outlet port of the valve under test is connected at its other end to said reservoir, said outlet line having a valve and a sight glass therein, whereby the flow of oil through said sight glass will indicate opening of pressure controlled valve means in the unit under test.

4. The combination set forth in claim 1 for testing a temperature controlled valve of the type having two control ports for flow of fluid into and out of the valve, in said test equipment including a pair of pressure gauges having means for connection thereof to the control ports of the temperature controlled valve.

References Cited in the file of this patent

UNITED STATES PATENTS

| | | |
|---|---|---|
| 2,364,709 | Greer | Dec. 12, 1944 |
| 2,450,922 | Snider | Oct. 12, 1948 |